3,682,859
FREE-FLOWING TETRAFLUOROETHYLENE
POLYMER COMPOSITION AND PROCESS
OF PRODUCING THE SAME
Ronald B. Taylor, Swarthmore, Pa., and Kerin G. Boardman, Palos Verdes, Calif., assignors to Liquid Nitrogen Processing Corporation, Malvern, Pa.
No Drawing. Continuation-in-part of application Ser. No. 787,218, Dec. 26, 1968. This application June 20, 1969, Ser. No. 835,263
Int. Cl. C08f 29/16, 47/02
U.S. Cl. 260—41 AG
5 Claims

ABSTRACT OF THE DISCLOSURE

A free-flowing tetrafluoroethylene polymer composition which comprises a uniform mixture of tetrafluoroethylene polymer particles having a maximum dimension of between 10 to 100 microns and between 0.01 to 10 weight percent of a fluorinated ethylene/propylene copolymer. The mixture may have fillers, e.g. about 5 to 40 weight percent of glass fibers. The process of producing the aforesaid free-flowing mixture includes the steps of tumbling the tetrafluoroethylene polymer and the copolymer in the presence of an organic liquid which wets the tetrafluoroethylene polymer and which has a surface tension of below 40.0 dynes per centimeter.

---

This invention is directed to a free-flowing tetrafluoroethylene polymer composition and to a process of producing the same.

This invention is a continuation-in-part of our patent application Ser. No. 787,218, filed Dec. 26, 1968 now abandoned.

This invention pertains to the production of tetrafluoroethylene polymer compositions in powdered form which powders do not pack together on standing or upon application of slight, normal pressure, but, to the contrary, maintain the free-flowing characteristics imparted to them by the processes of this invention. More specifically, this invention relates to the modification of tetrafluoroethylene polymers by the addition of a fluorinated ethylene/propylene copolymer in such a manner that a powdered blend is produced in which the individual particles have hard surfaces that prevent the "balling-up" normally found in pulverulent tetrafluoroethylene polymer powders.

As is well known, tetrafluoroethylene polymer, or as it is also called poly(tetrafluoroethylene), (PTFE) is an excellent polymeric material for many uses, but suffers the drawback that when it is in powdered form the individual particles tend, on standing, or upon application of slight pressures, to compact into larger particles. In other words, the polymers in powdered form are not as free-flowing as desired. The compacting characteristics prevent one from effectively molding and extruding the polymers, because the powder does not flow into small cavities or recesses in the molds. By way of example, mixtures of tetrafluoroethylene polymer and glass fibers are normally milled in a high shear mixer such as a hammermill to produce a finely dispersed blend of the ingredients. These powders have been used to fill a wide variety of shapes where the opening to be filled with powder is normally less than one-half inch in size. The failure of the fine powder to flow into small cavities or recesses on molding yields shaped articles having voids and physical properties that are not acceptable. The elongation and tensile strength of the void-containing articles prevent their use in many applications.

For a PTFE molder to fill a mold cavity with an opening of one inch diameter or less is difficult with conventional non-free flowing PTFE compositions. It is, however, a common practice in the PTFE industry as well as in other industries to agglomerate a product to render it free-flowing. One method of agglomerating is to wet the material with a liquid and then tumble to give a balling effect. The liquid is then removed normally by conventional atmospheric or vacuum drying.[1] The method of drying the agglomerated material affects the final characteristics of the product. If the standard agglomerated material is placed in an atmospheric or vacuum oven on trays and dried, a free-flowing particle is obtained. Any other drying method which does not agitate the material is also acceptable. If, however, a firmer and more dense particle, which will have even better flow characteristics is desired, the wet, agglomerated material is dried while being tumbled. This work input does, however, decrease the physical properties of the final product. This decrease in properties is undesirable, and often the decrease cannot be tolerated.

Therefore, it is an object of this invention to modify tetrafluoroethylene polymer powders in such a way that a superior free-flowing product is produced without sacrificing other physical properties.

A further aim is the addition of small amounts of an additive which will produce the improved flowing characteristics, but which does not appreciably impair the desired properties in the shaped articles due to and desired from the tetrafluoroethylene polymer which may be filled or unfilled.

A still further goal is the production of small particles of tetrafluoroethylene polymer which have hard surfaces in comparison to the soft surfaces of other pulverulent tetrafluoroethylene polymer powders.

A still further objective is the provision of processes for effecting the production of the stated compositions.

These and further objectives will appear hereinafter.

The purposes of this invention are accomplished by admixing about 0.01% to about 10% of powdered fluorinated ethylene/propylene copolymer based on the total weight of the polymers in the blend to powdered tetrafluoroethylene polymer. This resin mixture may or may not be filled. The resultant dry blend is then wetted with about 10 to 40 weight percent (based on the total mixture of polymer, copolymer, organic liquid and filler) of an organic liquid having a surface tension of less than 40 dynes/cm. under conditions of agitation, as, for example, tumbling, the result being the production of agglomerated particles. These are then agitated as by tumbling, to produce the desired hardness in the resultant powdered blend. These hardened agglomerated particles may be tumbled under heat to substantial dryness or tumbled to hardness and then dried using conventional drying procedures.

If desired, any of many fillers may be present to produce filled compositions. Such fillers include glass fibers or beads, or bronze, graphite, molybdenum disulfide, coke flour, nickel powder, ceramics, cadmium oxide, various metallic oxides such as aluminum oxide and silica, silicates such as aluminum silicate and lithium aluminum silicate, metallic powders such as aluminum, iron, molybdenum or copper powders, potassium titanate, quartz, zircon flour, mica, or asbestos, or mixtures of the foregoing. One skilled in the art will choose the filler and its amount to lead to the desired physical properties in the end product.

If desired, the various ingredients may be simultaneously added to a tumbler, blended, agglomerated and dried therein, or, if preferred, the various ingredients, or different combinations of them, can be dry blended in the

---

[1] One form of this process is described in Pat. 3,265,679, issued Aug. 9, 1966.

absence of the organic liquid to produce powders, filled or unfilled, which can then be tumbled in the organic liquid agglomerating step referred to above.

This blending step in the presence of the organic liquid, which may be referred to as wetting and agglomerating, produces an agglomerated wet material. This is then agitated, usually in a tumbler, while applying heat to dry the material and to effect further agglomeration and hardness to the particles. The resultant product is a dry powder consisting of agglomerated particles having a hard and firm hand as compared to the soft crumbly hand of the initial tetrafluoroethylene polymeric powder, or a similarly agglomerated material which is tray dried, that is without agitation.

One can squeeze the resultant product of the present invention in one's hand or let it stand in containers indefinitely without getting the troublesome compacting that occurs with the unmodified tetrafluoroethylene polymer powder. Further the products produced by the processes of this invention can be of very small size. Their hard surfaces make them free-flowing and allow them to flow into the small crevices encountered in molding and extrusion processes, so that the resultant articles are well formed and have minimum void content. Thus, the shaped articles have optimum physical properties.

By tetrafluoroethylene polymer powder, or poly(tetrafluoroethylene) powder, or PTFE powder is meant powdered particles of tetrafluoroethylene polymer in those grades conventionally sold in the powdered state. The subject invention is applicable to tetrafluoroethylene polymer powder compositions having a maximum dimension of between about 10 to 100 microns, and preferably about 15 to 30 microns.

In the production of the free-flowing tetrafluoroethylene polymer compositions of the present invention from about 0.01% to about 10% of the fluorinated ethylene/propylene copolymer, based on the total weight of the polymers (namely the total weight of the tetrafluoroethylene polymer and the copolymer) in the blend, is added with about 0.5% to about 3.0% being preferred. Preferably, the copolymer is a commercially produced polymeric material sold by E. I. du Pont de Nemours Company, Inc., and referred to as FEP. This is a copolymer of perfluorinated propylene (HFP) and tetrafluoroethylene, the various copolymers being described in detail in U.S. Pats. Nos. 2,955,099; 2,946,763 and 3,085,083. The particle size of the copolymer should be between about one-half to 10 microns maximum dimension for the particles, and preferably between about 0.5 to 5 microns maximum dimension for the particles.

The amount of filler that is present can be varied over a wide range, depending upon the results that are desired. For example, the final product composition can contain from 0 up to about 50% by weight of any suitable filler, with such weight percentage of the suitable filler being based on the weight of the resultant product composition namely polymer plus filler (with the organic liquid being removed in the drying stage of the process).

A preferred result product composition contains between about 5 to 40 weight percent of glass fibers. Such glass fibers should have a length of between about 25 to 2000 microns, and preferably a length of about 200 microns. Their diameters should range between about 0.00037 inch to about 0.001 inch (this comprehends the types of glass fibers designated "G," "K," and "P").

Among the organic liquids that can be used are kerosene, naphtha; gasoline; alcohols such as methanol, ethanol, propanol, isopropanol, butanol; glycols such as ethylene glycol, diethylene glycol, propylene glycol, trimethylolpropane, dipropylene glycol; liquid petrolatum which is a white mineral oil containing paraffinic and naphthenic hydrocarbons; cetane; n-hexane; benzene; zylene; n-octane; n-nonane; chlorinated solvents, such as 1,1,1-trichloroethane, carbon tetrachloride, and perchloroethylene. Any organic liquid having a surface tension of below 40 dynes/cm. will wet PTFE and is suitable for the agglomerating step, provided that it does not appreciably attack the PTFE, and does not decompose on drying to materials which adversely affect the final composition.

While temperatures of from about 20° C. to about 200° C. may be used in the agitating or tumbling step, it is preferred to use temperatures in the range of about 150° F. to 300° F. for tumbling and drying. The temperatures that are used will, of course, be below the sintering temperature (327° C.) of poly(tetrafluoroethylene) when that polymer is used. However, the temperature may be above the melting point of the FEP copolymer which is in the range of 250° C. to 300° C. The length of time in the agitating or tumbling step depends, of course, on the amount of material being processed, the amount of organic liquid that is being used, its evaporation rate, the particle hardness desired, whether any subsequent drying procedure will be used, and the like. One will know from previous experiences or by aliquot testing when a dry product is obtained. The drying should normally be continued until the moisture (free liquid content, not necessarily water) of the entire mixture of polymer and filler is below 0.03 weight percent. The reason why the moisture should be removed to this level is that having a volatile material, namely the organic liquid, in the billet formed from the composition will cause volatilization on molding, and a resultant void in the finished product. The drying time is not critical, for tumbling the dry product beyond the accomplishment of complete removal of the organic liquid does not adversely affect the free-flowing characteristics of the polymer.

The invention will be further understood by reference to the following examples which are given for illustrative purposes and are not limitative, all parts being given as parts by weight unless otherwise indicated.

EXAMPLE 1

This example demonstrates the effects obtained using the FEP additive of this invention, but omitting the tumbling step and contact with the organic liquid.

A 1/32 inch milled fiber glass is added to a granular poly(tetrafluoroethylene), PTFE, at a loading of 20% by weight of the total mix. The mixture is dry blended. Billets (1 inch by 1.5 inches) are made from the resultant blend, and these are tested in the customary fashion for tensile strength and elongations.

The experiment is repeated but 0.01% of the poly(tetrafluoroethylene) is replaced by FEP and in subsequent experiments 0.1%, 1.0%, 2.0% and 10.0% of the PTFE is replaced with FEP [2]. The results are tabulated below.

TABLE I
Effect of FEP Loading

|  | Tensile strength (p.s.i.) | | Elongation (percent) | |
|---|---|---|---|---|
|  | MD [1] | CD [1] | MD | CD |
| 80% PTFE [2] 20% milled fiber glass [3] | 2,500 | 3,100 | 280 | 270 |
| 79.99% PTFE, 0.01% FEP,[4] 20% milled fiber glass | 2,550 | 3,175 | 290 | 285 |
| 79.9% PTFE, 0.1% FEP, 20% milled fiber glass | 2,600 | 3,200 | 295 | 290 |
| 79.0% PTFE, 1.0% FEP, 20% milled fiber glass | 2,700 | 3,300 | 315 | 310 |
| 78.0% PTFE, 2.0% FEP, 20% milled fiber glass | 2,675 | 3,225 | 300 | 300 |
| 70.0% PTFE, 10.0% FEP, 20% milled fiber glass | 2,575 | 3,150 | 285 | 280 |

[1] MD=Mold direction; CD=Cross direction.
[2] In each of the examples the PTFE was Teflon 7 manufactured by E. I. du Pont de Nemours having an average particle size of 15 to 30 microns.
[3] In each of the examples the milled fiber glass was 1/32 inch milled K fiber having a diameter of .00051 inch (nominal).
[4] In each of the examples the FEP was Teflon 100 manufactured by E. I. du Pont de Nemours having an average particle size of 0.3 to 1.2 microns.

[a] In each of the examples, the weight percentages of the PTFE, FEP, and glass fibers are based on the total weight of the mixture thereof, namely the weight thereof in the resultant product composition of the example.

The above results demonstrate that the addition of FEP in the given amounts leads to increases in tensile strengths and elongations. Free-flowing characteristics are not possessed by the products of this example.

EXAMPLE II

The purpose of this experiment is to demonstrate that the improvements obtained in Example I are achieved when fillers other than fiber glass are used.

As is known, PTFE can be filled with a gamut of various inorganic fillers. Example I was repeated using carbon and bronze as representative of the many fillers used extensively in the industry. The results of replacing about 1% of PTFE with 0.5 micron FEP is shown below.

TABLE II

Effect of FEP on Various Fillers

| Filled mixture | Tensile strength (p.s.i.) | | Elongation (percent) | |
|---|---|---|---|---|
| | MD | CD | MD | CD |
| Milled glass fiber 20% TFE 80% | 2,500 | 3,100 | 280 | 270 |
| Milled glass fiber 20%, PTFE 79%, FEP 1% | 2,700 | 3,300 | 315 | 310 |
| Carbon [1] 15%, PTFE 85% | 1,300 | 2,700 | 91 | 123 |
| Carbon 15%, PTFE 84%, FEP 1% | 1,775 | 2,450 | 130 | 240 |
| Bronze [2] 60%, PTFE 40% | 1,850 | 2,300 | 65 | 77 |
| Bronze 60%, PTFE 39%, FEP 1% | 2,050 | 2,600 | 90 | 130 |

[1] The carbon was a granular carbon graphite having a particle size of 99½ weight percent through 100 mesh and 45 weight percent minimum through 325 mesh screen.
[2] The bronze was 90 percent weight copper and 10 weight percent tin bronze having a particle size of 99½ weight percent particles pass through a 100 mesh screen, and minimum of 40 weight percent through 325 mesh screen.

From the above it can be seen that the addition of FEP leads to improved tensile strengths and improved elongations in various filled compositions. Here again, the free-flowing properties of the products of this invention are not attained, the requisite processing having been omitted.

EXAMPLE III

This experiment demonstrates that products having the desired tensile strengths and elongations and the desired free-flowing properties are attained in accordance with the present invention.

In this example, the mixtures were blended with one pound of ethanol per two and a half pounds of mixture and dried in accordance with the procedure set forth below.

TABLE III

Effect of Drying Agglomerated Filled PTFE with and without FEP

| | Tensile strength (p.s.i.) | | Elongation (percent) | |
|---|---|---|---|---|
| | MD | CD | MD | CD |
| No FEP—75% TFE, 25% milled glass fiber: | | | | |
| A. Dried while stationary at 130° C | 1,750 | 1,850 | 200 | 215 |
| B. Dried while tumbling at 130° C | 1,200 | 1,300 | 90 | 95 |
| With FEP—74% PTFE, 1% FEP, 25% milled glass fiber: | | | | |
| C. Dried while stationary at 130° C | 2,200 | 2,300 | 220 | 230 |
| D. Dried while tumbling at 130° C | 2,000 | 2,100 | 210 | 220 |

As can be seen, A and C are produced in a similar manner without the tumbling step. In C an improvement in physical properties is obtained, but the improved free-flowing properties of this invention are not obtained even though FEP has been added.

From comparing experiments B and D and B and A, it will be noted that the tumbling gives free-flowing properties to the A composition but a loss in tensile strength and elongtaion occurs. However, in the D composition, which includes FEP, not only is the free-flowing property of this invention obtained but the physical properties are improved. While it is true that they are slightly less than those of product C, the new free-flowing characteristic is so highly desirable that the loss is not considered a disadvantage, being as small as it is.

EXAMPLE IV

To test the moldability of the products of this invention and shaped articles therefrom, 100 parts of a product of this invention obtained using 1% of FEP were molded (the product of Table III D) into rings having a diameter of 3 inches and a height of 0.090 inch and a width of 0.060 inch. A similar product, comparable in all respects except that it contained no FEP (the product of Table III B) was shaped into rings also on the same ring preformer, and all rings were similarly sintered. The press mold was a ring 3.50" O.D. and 0.064 inch wide and set to deliver a ring 0.090 inch high preformed at 7500 p.s.i. The rings were then tested and were found to compare as follows:

TABLE IV

| Physical tested | Control | Rings of this invention |
|---|---|---|
| Lowest ring height variation, inches | 0.0110 | 0.0080 |
| Highest ring height variation, inches | 0.0205 | 0.0130 |
| Average ring height variation, inches | 0.0168 | 0.0107 |
| Average pounds to break | 18.2 | 23.9 |
| Range pounds to break | 12.5–24.2 | 21.6–26.7 |
| Average tensiles, p.s.i | 1,469 | 1,871 |
| Average elongation, percent | 48 | 121 |
| Range elongation, percent | 8–162 | 61–193 |

From the above it can be seen that the shaped articles made from the products of this invention are far superior to those previously produced.

The present invention may be embodied in other specific forms without departing from the spirit or essential attributes thereof.

In the interpretation of the following claims, it is to be understood that the term "copolymer of perfluorinated propylene and tetrafluoroethylene" is intended to refer to copolymers such as those described in U.S. Pats. Nos. 2,955,099; 2,946,763 and 3,085,083.

We claim:

1. A pulverulent mixture consisting essentially of a uniform blend of 0.01 to 10 weight percent of a copolymer of perfluorinated propylene and tetrafluoroethylene, said copolymer having a particle size of about ½ to 10 microns (maximum dimension), and from 90 to 99.99 weight percent of powdered granular tetrafluoroethylene polymer having a particle size of about 10 to 100 microns (maximum dimension), with the aforesaid weight percentages being based on the total amount of polymer and copolymer present, said uniform blend forming a free-flowing powder when agglomerated with an organic liquid and dried while tumbling.

2. A pulverulent mixture in accordance with claim 1 wherein the uniform blend has a moisture content of less than 0.03 weight percent after agglomeration, drying and tumbling.

3. A pulverulent mixture in accordance with claim 1 in which said copolymer is present to the extent of about 0.5 to 3 weight percent (based on the total amount of polymer and copolymer present).

4. A pulverulent mixture in accordance with claim 1 which includes a filler, with the filler being present up to about 50 percent by weight (based on the total blend).

5. A pulverulent mixture in accordance with claim 4 in which the filler is glass fibers having a length of between 25 to 2000 microns, and a diameter of between 0.00037 and 0.001 inch, with said glass fibers being present in the amount of about 5 to 40 weight percent (based on the blend).

References Cited

UNITED STATES PATENTS

| | | | |
|---|---|---|---|
| 2,593,583 | 4/1952 | Lontz | 260—92.1 |
| 3,051,683 | 8/1962 | Mallouk | 260—45.5 |
| 3,265,679 | 8/1966 | Black et al. | 260—92.1 |
| 3,372,136 | 3/1968 | Kometani et al. | 260—900 |
| 3,434,996 | 3/1969 | Salatiello et al. | 260—33.8 F |

MORRIS LIEBMAN, Primary Examiner

T. DE BENEDICTIS, Sr., Assistant Examiner

U.S. Cl. X.R.

260—33.4 F, 33.6 F, 33.8 F, 34.2, 884, 900